United States Patent [19]

Glowny et al.

[11] Patent Number: 5,758,052
[45] Date of Patent: May 26, 1998

[54] NETWORK MANAGEMENT METHOD USING REDUNDANT DISTRIBUTED CONTROL PROCESSORS

[75] Inventors: David Andrew Glowny, Naugatuck; Colette Anne Mastrangelo, Danbury; Paul Melvin Mayer, Middlebury; Caryl Marlene Rahn, Waterbury, all of Conn.

[73] Assignee: International Business Machines Corporation, Armonk, N.Y.

[21] Appl. No.: 771,063

[22] Filed: Oct. 2, 1991

[51] Int. Cl.[6] .................................................. G06F 11/00
[52] U.S. Cl. ............................. 395/182.02; 395/182.1
[58] Field of Search ........................ 395/575, 650, 395/182.02, 182.1, 200.11, 200.1; 364/281.3, 284.3, 284.4, 283.2; 375/107; 455/51.1, 53.2

[56] References Cited

U.S. PATENT DOCUMENTS

| | | | |
|---|---|---|---|
| 4,142,069 | 2/1979 | Stover | 179/15 BS |
| 4,363,093 | 12/1982 | Davis et al. | 364/200 |
| 4,551,721 | 11/1985 | Kozlich | 340/825.52 |
| 4,817,091 | 3/1989 | Katzman et al. | 371/9 |
| 4,933,838 | 6/1990 | Elrod | 364/200 |
| 4,939,752 | 7/1990 | Literati et al. | 375/107 |
| 5,003,464 | 3/1991 | Ely et al. | 364/200 |
| 5,005,122 | 4/1991 | Griffin et al. | 364/200 |
| 5,056,000 | 10/1991 | Chang et al. | 364/200 |
| 5,068,877 | 11/1991 | Near et al. | 375/107 |
| 5,140,689 | 8/1992 | Kobayashi | 395/575 |
| 5,148,540 | 9/1992 | Beardsley et al. | 395/575 |
| 5,159,592 | 10/1992 | Perkins | 370/85.7 |
| 5,179,715 | 1/1993 | Andoh et al. | 395/800 |

FOREIGN PATENT DOCUMENTS

| | | |
|---|---|---|
| 0367699 | 6/1990 | European Pat. Off. . |
| 0442839 | 8/1991 | European Pat. Off. . |

*Primary Examiner*—Robert W. Beausoliel, Jr.
*Assistant Examiner*—Joseph E. Palys
*Attorney, Agent, or Firm*—W. A. Kinnaman, Jr.

[57] ABSTRACT

A distributed network management system for managing redundant global network control points. The network management system allows candidate control points to determine which is primary and which are alternates, initializes the primary and alternate control points, synchronizes global data, and manages client interaction with the control points. The control points negotiate primary status by establishing a named resource in each processor and by testing for the lowest network address in each active processor. In addition, each client workstation determines which of the candidate control points is primary by interrogation. Client processes detect primary control point failures and switch the alternate control point to primary status.

11 Claims, 7 Drawing Sheets

NETWORK MANAGEMENT METHOD USING REDUNDANT DISTRIBUTED CONTROL PROCESSORS

BACKGROUND OF THE INVENTION

1. Field of the Invention

The present invention relates to systems and methods for globally managing distributed data processing systems, and in particular, relates to methods for managing a plurality of processors connected by a communications network.

2. Background of the Invention

Computer solutions are being increasingly implemented in the form of distributed computer processors connected by a communications network. An example of such a network is a series of workstations, such as the IBM Personal System/2 (IBM PS/2) computer or the IBM RISC System/6000 workstation (Personal System/2, PS/2, and RISC System/6000 are trademarks of the IBM Corporation). These workstations may be connected by a local area network (LAN) operating as a token ring, ethernet, or other form of network.

Management and control activities for the network are typically assigned to one of the processing elements on that network. Network control is required to manage global activities impacting the entire network and for maintaining status information. The network manager node or control point performs services in response to requests from client workstations. The control point typically comprises a workstation with processing capabilities and attached files or databases for maintaining control and status information. An example of a network with a service management control point is described in U.S. Pat. No. 5,005,122, issued on Apr. 2, 1991.

The designation of a single workstation node as a network control point can lead to problems if the control point has a hardware or software failure: the network operation will cease until the failure is corrected. One possible solution to this single point of failure is to provide redundant control points. Such redundancy, however, creates its own problems. First, each of the clients must be able to determine which of the candidate control points is currently providing management functions. Second, when the network is started and when workstations are brought on-line, the control point processors must be able to determine their current status as primary or alternate. Finally, the global data used by the control points to manage the network and global activities must be consistent across the primary and alternate processors so that a switch to an alternate control point does not cause corruption of the network activities.

A fault tolerant multiprocessor system is disclosed in U.S. Pat. No. 4,817,091. This fault tolerant system requires periodic transmission messages with the status of each processor on the device. The switch from primary to backup processors occurs when the processor fails to detect a predetermined signal during a fixed time window. Upon failure to detect the signal, the processor itself will initiate steps to assume control of the operation.

A technical problem therefore exists in creating a distributed computer network with redundant control points that is able to automatically manage the designation of primary and alternate control points, the identification of the current primary control point by client processors, and the maintenance of synchronized data between candidate control points.

SUMMARY OF THE INVENTION

It is therefore an object of the present invention to provide a system and method for managing a distributed network having a plurality of control point processors. The process and apparatus of the present invention provide facilities for network management and methods and processes for managing the interaction between control point processors. The present invention initializes the control point processors and causes each processor to initiate negotiations with the other control point processors to determine which should be designated as the primary. Negotiation results in the designation of a single primary and one or more alternate control points. The present invention also provides processes for synchronizing the data storage between the control points. Finally, the present invention allows client processors to query each control point in an attempt to locate the current primary control point. Failure of the designated control point to respond to a client request will initiate a process whereby the client notifies an alternate control point of the need for that processor to assume the primary control point responsibilities.

These and other objects of the invention will be described in greater detail with reference to the attached drawings.

DETAILED DESCRIPTION OF THE PREFERRED EMBODIMENT

Figure 1:
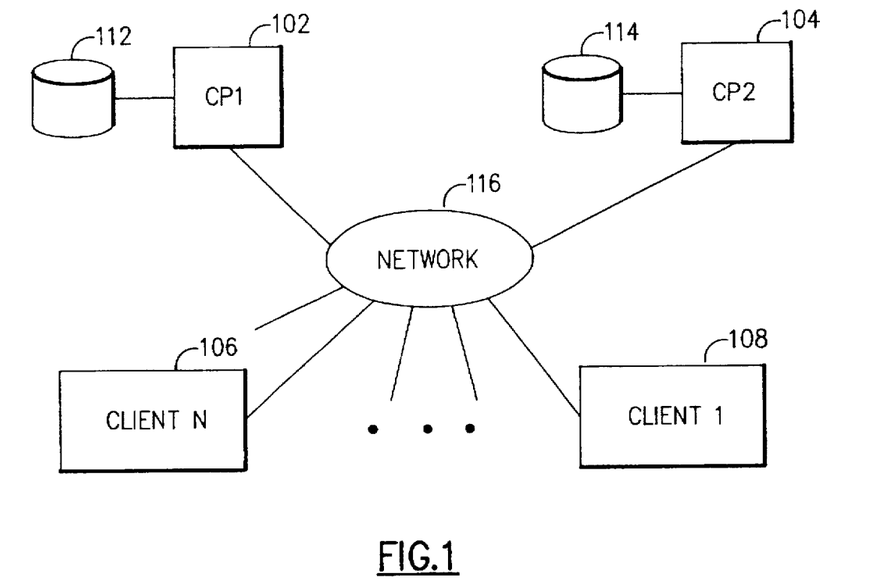
FIG. 1 is a block diagram showing a distributed network capable of management by the present invention.

A distributed network for use with the system and method of the present invention is shown conceptually in FIG. 1. The network comprises a plurality of processors 102, 104, 106, and 108 connected to a communications network 116. Any number of such processors could be attached depending only on the physical limitations of the network. Each of the processors has data processing capabilities and optionally may have permanent data storage such as disks 112 and 114. The preferred embodiment employs an IBM Token Ring Network management scheme, however, it will be appreciated that any network protocol can be used with the present invention.

The workstations in the network are typically designated as having specific functions. Among the functions to be allocated are control point management processing activities. The control point processor manages global activities (affecting the entire network) and maintains overall status of the network. In the preferred embodiment, redundant control point processors are designated to ensure operation in spite of the failure of one of the control points.

Redundant processors labelled Control Point 1 (CP1), 102, and Control Point 2 (CP2), 104 are shown in FIG. 1. The other network attached processors such as 106 and 108 are termed "client" processors and use the services of control points 102 or 104. As will be discussed in greater detail below, one of the control points will be designated as the primary control point while the others will be designated as alternate control points. More than two control point processors may be provided within the scope of the present invention. The control point processors are collectively referenced as control point candidates.

Figure 2:
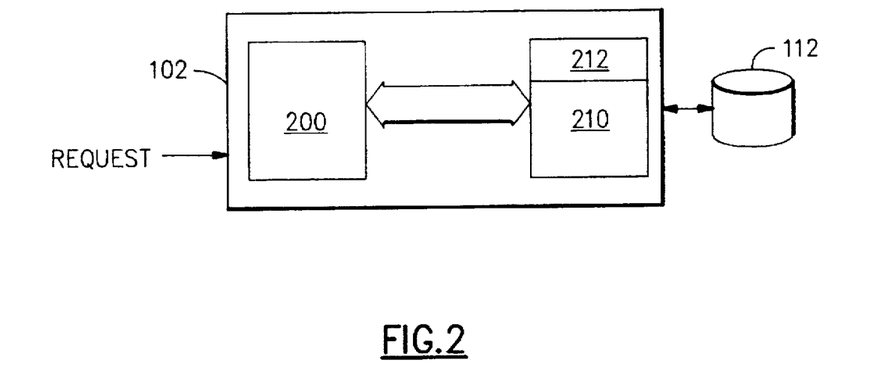
FIG. 2 is a block diagram showing the structure of a control point processing element according to the present invention.

The structure of a control point processor 102 is shown in greater detail in FIG. 2. A control point processor is configured to process two types of programs. The first set of programs 200 are transaction-type programs that service client requests for service or perform other control point requested functions. A second set of programs 210 are termed "backend" programs. The backend programs process requests from the transaction programs to access or modify control point tables stored on permanent storage 112. One of the specialized backend tasks is monitor 212. Monitor 212 manages the overall backend processing including tracking whether this control point is a primary or alternate control point. Other backend processes perform access and updates to a subset of network data tables. The data required for global management, in the preferred embodiment, is divided into a number of tables with dedicated backend processing. These tables are stored in storage devices such as disks 112 and 114. Division into a number of tables reduces potential conflict during access and update cycles. The backend processes operate in synchronization with transaction processes to manage data exchange.

Figure 3:
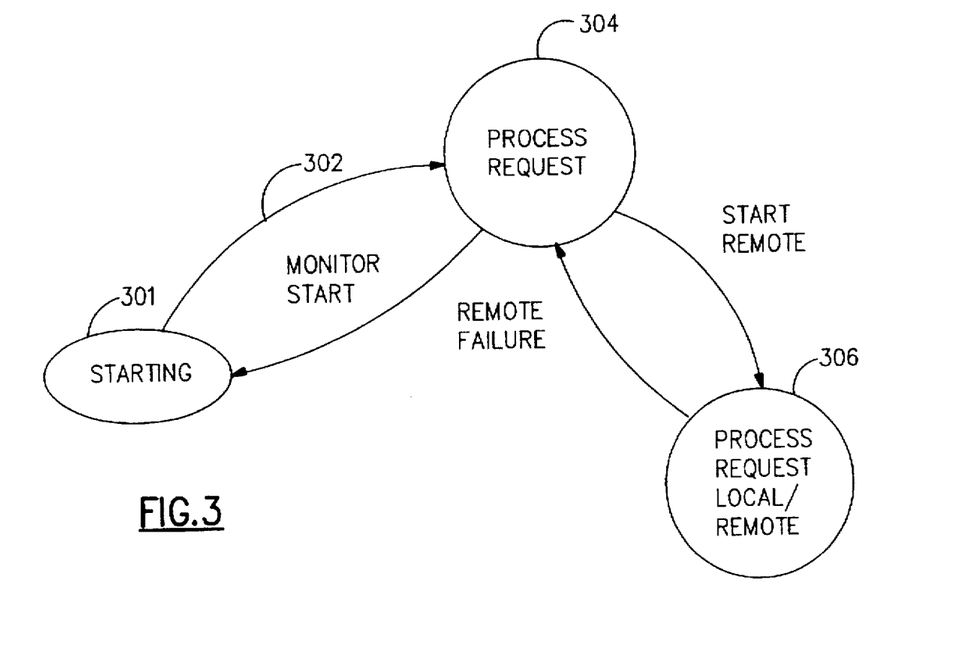
FIG. 3 is a state diagram showing the states which backend processes assume.

The backend processes typically transition between three main states as shown in FIG. 3. Upon initialization, the backend process is placed in a "starting" state 301. When the monitor determines that the process backend should be activated, a monitor "start request" 302 is sent causing the backend process to move into a request processing state 304. The backend process remains in this state until the monitor sends a "start remote" command which causes the process to establish a remote as well as local update capability.

A failure in the remote processor will cause the backend task to return to "request process" state 304. After the remote processor is fixed, a "remote start" command can be issued to restart remote processing. A local processing failure causes the failing component to terminate and the alternate control point to request it be made primary.

The backend processing state 301 "starting" ignores any client requests for services and returns a successful completion status to the requester. In state 304 process requests, the backend process handles the required processing and causes updates to be made to the local tables.

Figure 4:
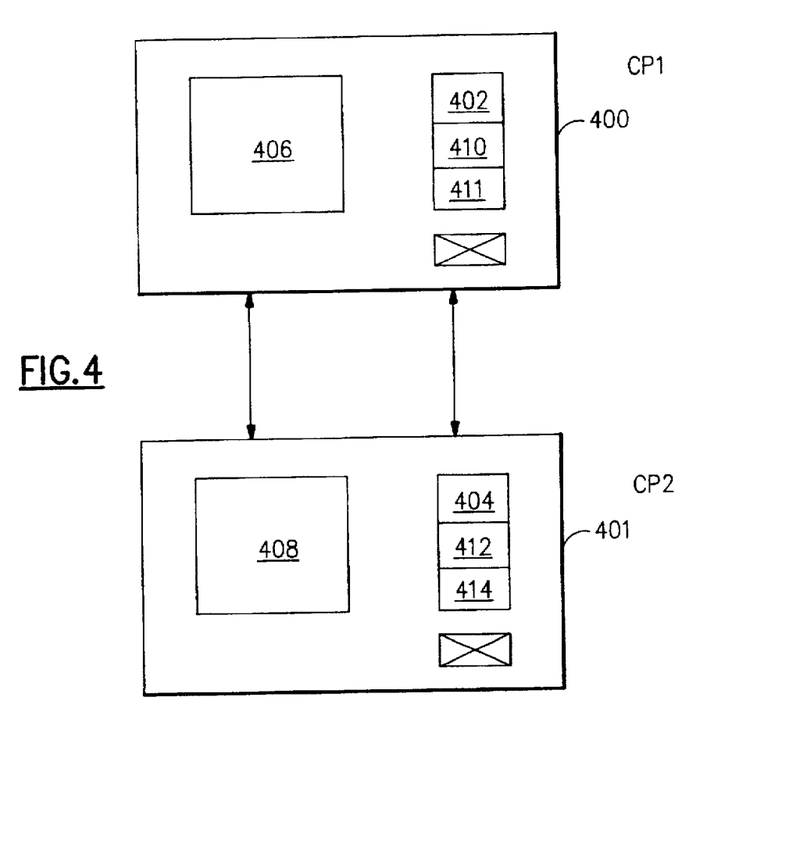
FIG. 4 is a schematic diagram illustrating the processing of control point startup.
Figure 5A:
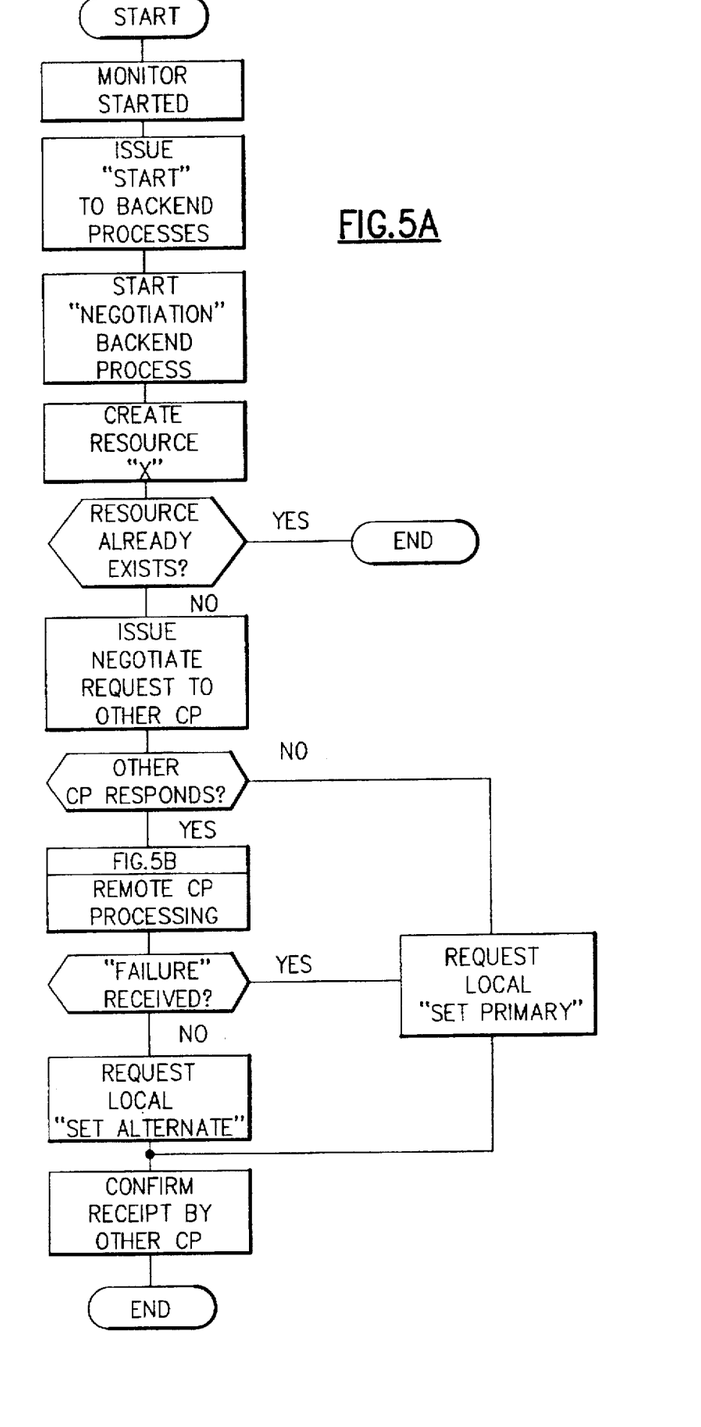
FIGS. 5(a) and 5(b) are flowcharts depicting the process steps involved and control point startup and negotiation of primary control status.

As discussed above, the monitor process 212 in the control point 102 determines whether this is the primary or an alternate control point. The determination of status is made initially at startup and can be modified during operation. The process for arbitrating or negotiating control point status will be described with reference to FIG. 4 and the flowchart of FIGS. 5(a) and 5(b). FIG. 4 shows the general structure of two control point processors, each with a monitor program 402 and 404 as well as transaction programs 406, 408 and backend programs 410 and 412. The control point elements would communicate over the network as discussed above. However, for simplicity, FIG. 4 shows a direct connection between the control point processors.

Control point startup initiates the following activities to determine control point status. The following discussion assumes the first control point processor (400 in FIG. 4) is being started with control point 2, 401, also existing on the network. The workstation will initially start monitor program 402. Monitor 402 issues a start to any needed local backends. Local backends may include a configuration controller, a session administrator and a terminal administrator. Once the backends have been started the monitor starts a specialized negotiation backend whose responsibility is determining control point status.

The negotiation program implements the following process for determining which of the control point candidates is primary. The process first creates a named resource X on control point 400. Resource X exists only while it is being accessed by the negotiation backend and returns a signal to any other process attempting to create this resource. If the negotiation process receives a message indicating resource X already exists, the process is terminated with no further action being taken.

Once the resource has been created, negotiation process 410 issues a negotiate request to the other control point 401. If processor 400 is not able to access processor 401, the negotiation backend 410 sends a request to the monitor 402 to become the primary control point.

Figure 5B:
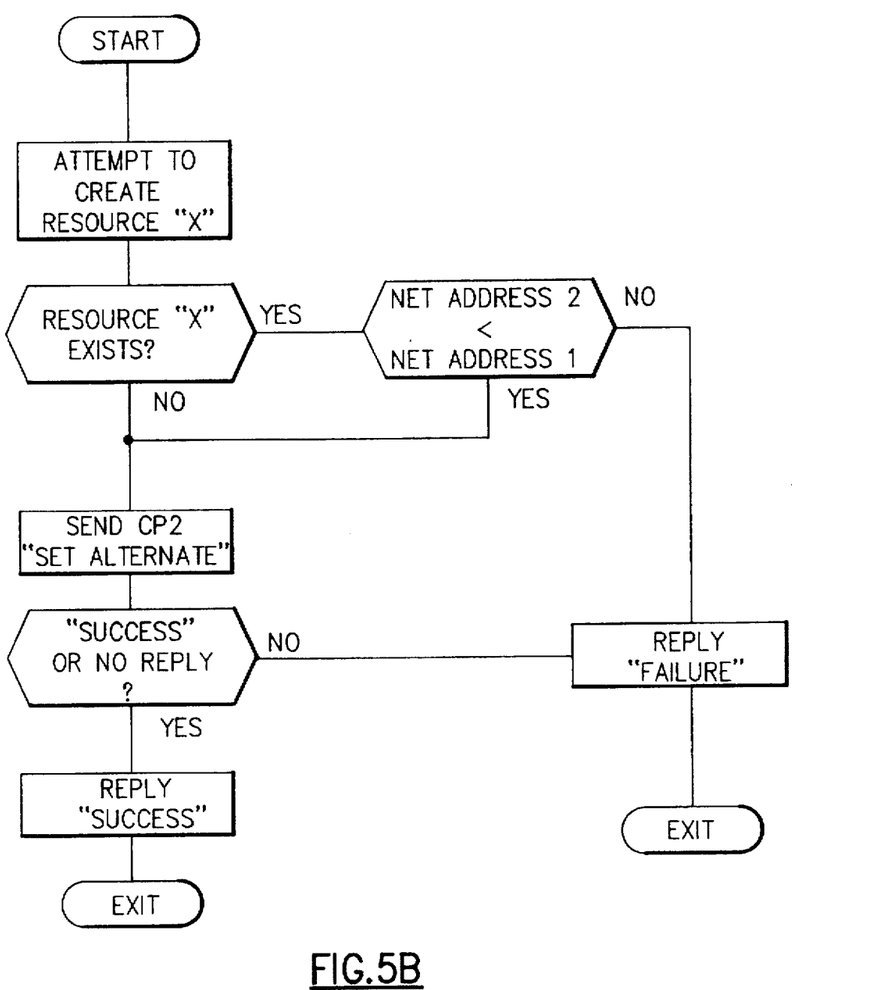

The second control point processor 401 follows the following process when it receives a negotiate request from another control point (see FIG. 5(b)). Again, this function would be performed by any other candidate control point and processor. Control point processor 401 starts a negotiate program backend 414. This negotiate program attempts to create named resource X on second control point processor 401. If resource X already exists, the negotiate program compares the network address or network name of resource X on processor 401 with that from the first processor 400. In the preferred embodiment, if the network address of second processor 401 is lower than the network address from resource X of first processor 400, then processing continues. Otherwise, a failure message is returned to negotiation backend 410 and the negotiation program exits. Negotiation backend 410 sends a message to monitor 402 to await a "set alternate" request from control processor.

If resource X does not exist on second processor 401, then negotiation program 414 attempts to send monitor 404 of control point 401 a "set alternate" request. If monitor 401 fails to reply, or replies "success", then a success status is returned by negotiation program 414 to the first control point processor 401, negotiation program 411. If monitor 404 replies "failure" then negotiation program 414 returns "failure" to control point 400. Monitor failure 404 would occur if the second control point 401 is already operating as the primary control point. Resource X is held until the first control point 400 confirms the reply from negotiation program 401.

Control processor 400 receives the status from control processor 401. If "success" is received, then the monitor is requested to be set to primary. Otherwise, the monitor is set to alternate. The first processor confirms receipt of reply by the other processor 402 and exits processing.

Figure 6:
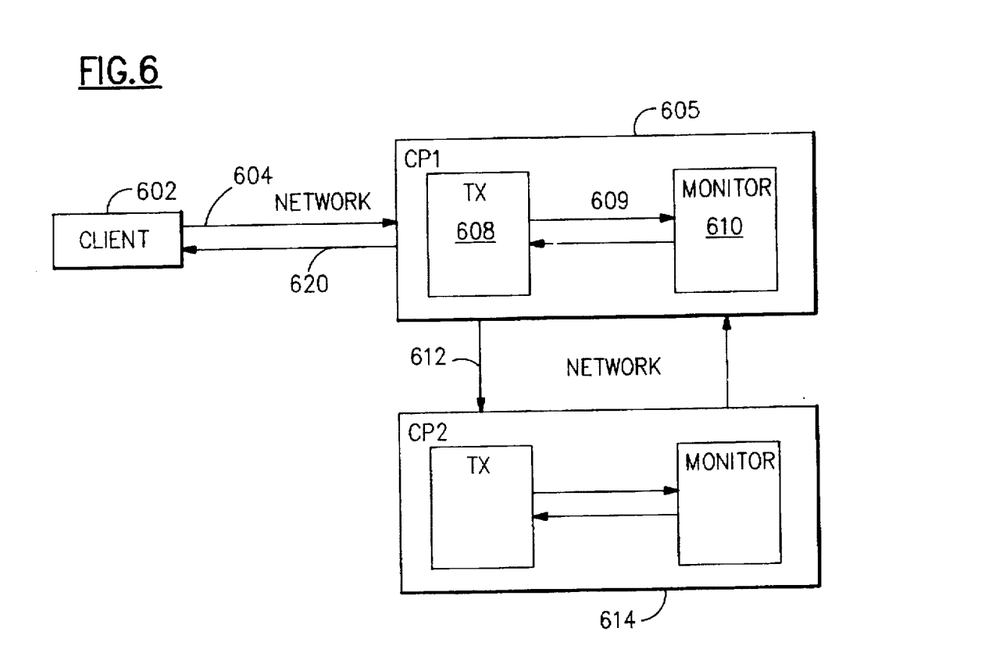
FIG. 6 is a schematic diagram illustrating the flow of messages during a client request for management action by a primary control point processor.

The result of the negotiation activities is the designation of a single processor as the primary control point. The next problem addressed by the present invention is determination by a client processor of which of the control point candidates is, in fact, the primary control point. As shown in FIG. 6, a client workstation 602 may issue a network request 604 requiring some action by the control processor. Client processor 602 must determine which is the primary control point for servicing of that request. The flowchart in FIG. 7 describes the process of the present invention for determining the primary control point.

Figure 7:
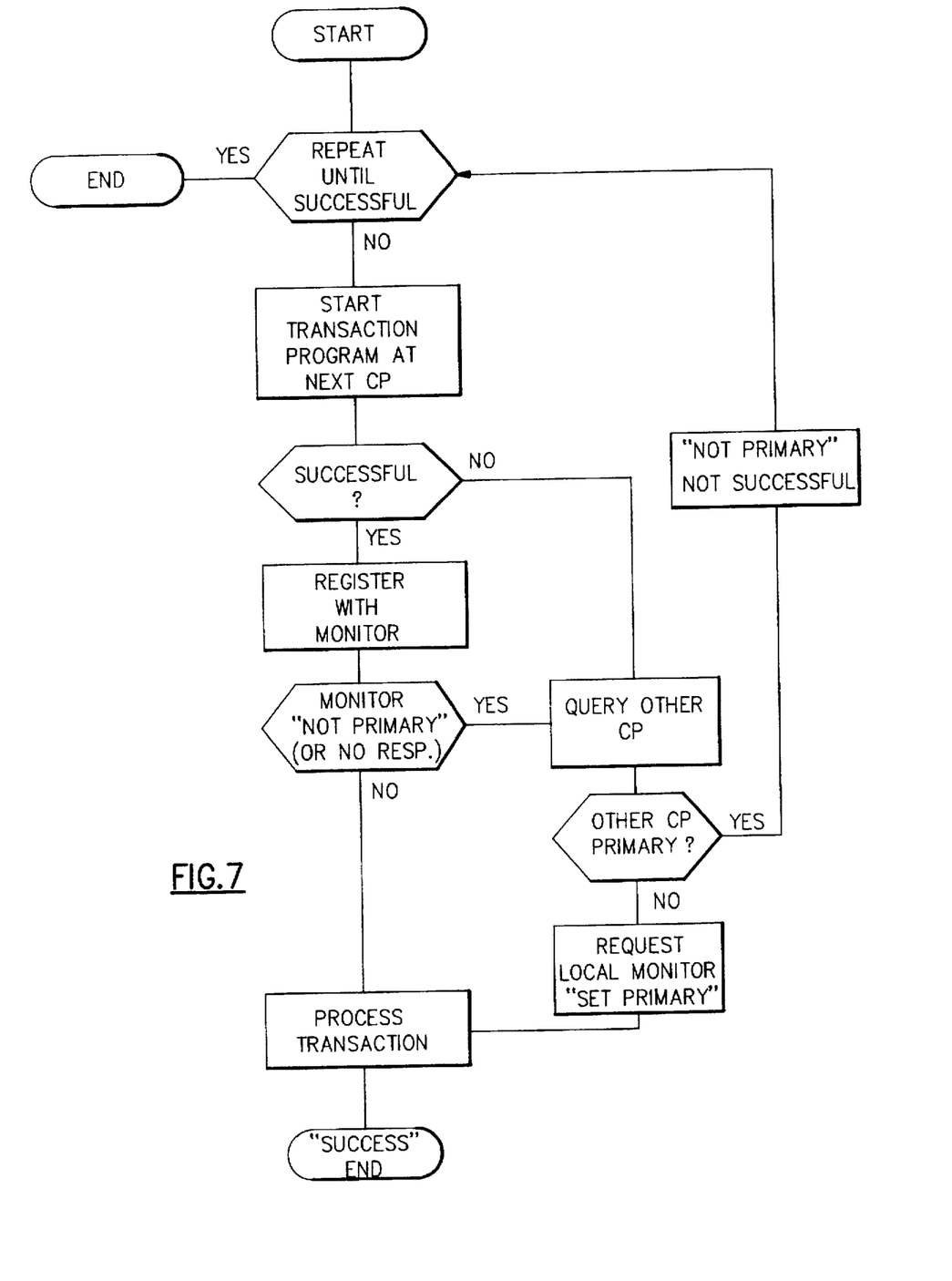
FIG. 7 is a flowchart depicting the process steps involved in client primary control point determination.

Each client processor 602 is provided with a static table listing all candidate control point processors. When the client desires to request service from the primary control point, the list of candidate control points is searched and each is queried for status. The status determination process is initiated by client 602 sending a request 604 to a first control point 606. The control point attempts to start a transaction program 608. If this fails, a failure status is returned to client 602. If successful, the transaction program will attempt to register with control point monitor 610. Registration request 609 sent between transaction program 608 and monitor 610 is an attempt to determine the status of control point 606. The monitor may return a status of "primary" or "not primary". If "primary" is returned, a successful completion code is returned. If no response or a "not primary" response is received, a "not primary" status is returned to client 602. If the transaction program 608 receives a "not primary" return code from the monitor, it will send a message 612 over the network to alternate control processor 614 in an attempt to determine the status of that control processor. If a successful response is returned to control point 606, (i.e. 614 is available as the primary control point) transaction program 608 returns a "not primary" message to the requesting client 602. Otherwise, if the second control point 614 fails to respond or responds with an error, then transaction program 608 issues a request to monitor 610 requesting it to change its status to "primary" control point.

Once a client process 602 connects to a transaction program 608 in a primary control point, the transaction program performs the requested transaction. If the final result 620 returned to client 602 is "not primary", then client 602 will send a request to the next control point in the table with a similar attempt to determine whether or not it is the primary control point. If all control point candidate addresses are processed without success, then no control point is available for client processing.

Global data used to manage the network and activities is contained in tables residing in data files or databases in the control point processors. In the preferred embodiment, the data is managed by a database management system as a set of database tables. Remote data services facilities of the OS/2 operating system are used to implement remote data distribution.

Figure 8:
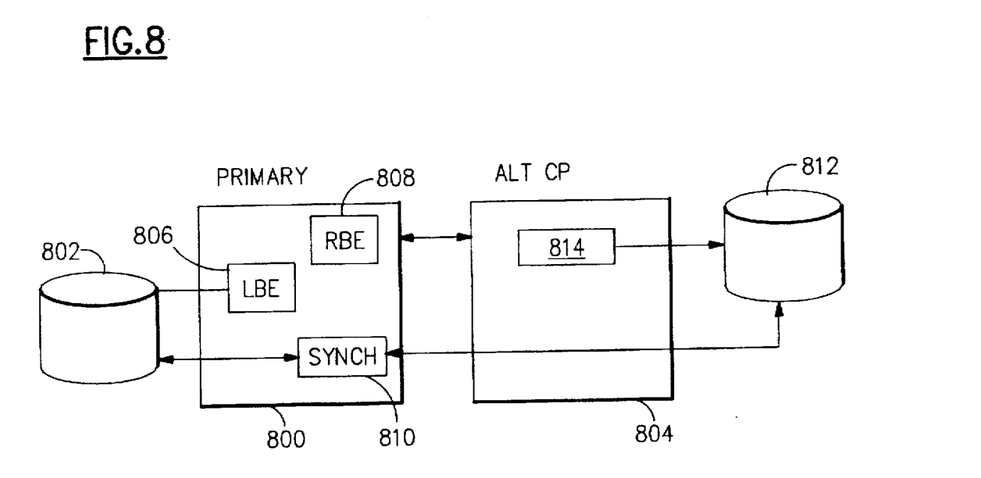
FIG. 8 is a schematic diagram illustrating the flow of messages during initial global data synchronization and synchronization maintenance.
Figure 9:
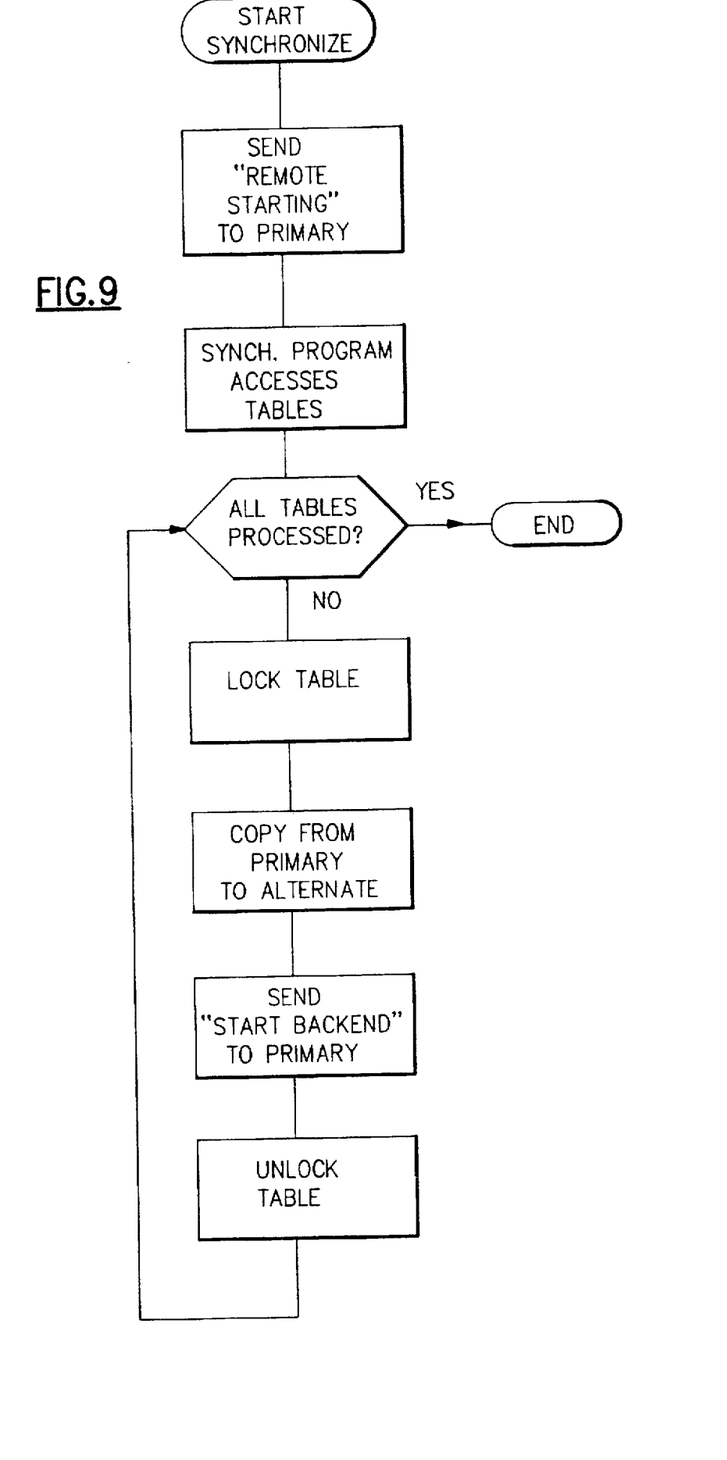
FIG. 9 is a flowchart depicting the process steps of initial synchronization and synchronization maintenance.

The global tables for network management must be synchronized between candidate control point processors to allow fallback in the case of control point failure. Synchronization is required when the network is initially started and when a control point processor is restarted after a failure. Synchronization activities will be discussed with reference to FIG. 8. The flowchart of FIG. 9 presents the process steps for data synchronization.

When a control point 804 receives a "set alternate" status as the result of control point negotiation, it must synchronize its tables with those of the primary control point 800. It must then request that the primary keep the tables in the alternate control point 804 updated so that it may assume control point responsibilities upon failure of the primary.

Primary control point 800 is assumed to be operating with certain data stored in tables 802. Alternate control point 804 begins processing by sending a "remote starting" message to the primary control point 800. The primary control point will start remote backends 806. It will also send to each local backend 808 a message to "start remote". This causes queues to be established in the control point processor 800 for forwarding data from the local to remote backends.

An initial synchronization program 810 is started in control point 800. This synchronization program accesses data 802 directly without using the services of local backend 808. Synchronization program 810 causes the data from 802 to be copied to the alternate control point 812 database.

As discussed above, subsets of tables are serviced by an individual backend process. The synchronization process requires that the table in the primary control point database 802 be locked so that it can be copied without being subject to corrupting modifications during the copying process. Once locked, the table is copied from the primary control point database 802 to the alternate control point database 812. The synchronization process operates on the alternate control point. Upon successful completion, a "start backend" message is sent to the primary control point causing the remote backends to be started. Upon reply from the primary control point, the tables are unlocked.

The above process steps cause tables 812 to be synchronized with tables 802. To maintain synchronization, primary control point 800 must continually pass changes to its data to the alternate control point 804. Remote backend 806 and the primary control point 800 manage this process by sending updates through the remote backend 814 in alternate control point 804 causing the update of database 812.

The above description has pointed out certain features of the present invention. It will be understood that many alterations or modifications can be made to describe the system and processes without departing from the true spirit of the invention. The invention is intended to be limited only by the following claims.

We claim:

1. In a network having a client node and a pair of control point nodes operable as servers to the client node, each control point node functioning as either a primary control point node or an alternate control point node, a method for establishing one of the control point nodes as a primary control point node to the client node, comprising the steps of:

(a) interrogating each control point node from the client node to determine its status as a primary or alternate control point node; and (b) at each control point node, in response to being interrogated by the client node:

(1) if the node is a primary control point node, advising the client node of the status of the control point node as a primary control point node;

(2) if the node is an alternate control point node, interrogating the other control point node for information regarding its status as a primary or alternate control point node;

(3) in response to the receipt of status information indicating that the other control point node is a primary control point node, advising the client node of the status of the interrogating control point node as an alternate control point node, otherwise, changing the status of the interrogating node to that of a primary control point node.

2. The method of claim 1 wherein the network comprises a primary control point node and a plurality of alternate control point nodes.

3. The method of claim 1 wherein each control point node has a flag indicating whether the node is a primary or alternate control point node, each control point node examining its flag upon being interrogated by the client node to determine its status as a primary or alternate control point node.

4. In a network having a pair of control point nodes, each node functioning as either a primary node or an alternate node, a method for establishing one of the nodes as a primary node, comprising the steps of:

(a) transmitting a negotiation request from one of the nodes to the other of the nodes; and (b) at the receiving node, in response to receiving the request from the transmitting node:

(1) prioritizing the transmitting and receiving nodes relative to each other in accordance with a predetermined scheme; and (2) if the priority of the transmitting node is higher than that of the receiving node and the receiving node is not already a primary node, establishing the receiving node as an alternate node and returning a first signal to the transmitting node establishing it as a primary node, otherwise, establishing the receiving node as a primary node and returning a second signal to the transmitting node establishing it as an alternate node.

5. The method of claim 4 wherein each node transmits a negotiation request to the other node.

6. The method of claim 4 wherein the network has a plurality of receiving nodes and wherein the transmitting node transmits a negotiation request to each receiving node in turn.

7. The method of claim 4, comprising the further steps of:

establishing the transmitting node as a primary node in response to the first signal from the receiving node or upon a failure to receive a first or second signal from the receiving node; and establishing the transmitting node as an alternate node in response to the second signal from the receiving node.

8. The method of claim 4 wherein step (a) comprises the steps of:

testing to determine whether a defined resource exists at the transmitting node;

if the defined resource does not exist, creating the resource and continuing processing; and if the resource already exists, terminating without further processing.

9. The method of claim 8 wherein the transmitting node terminates the resource after being established as a primary or alternate node.

10. The method of claim 4 wherein step (b) comprises the steps of:

testing to determine whether a defined resource exists at the receiving node;

if the defined resource already exists, continuing processing;

if the resource does not already exist, creating the resource, returning the first signal to the transmitting node and terminating without further processing.

11. The method of claim 10 wherein the receiving node terminates the resource after returning a first or second signal to the transmitting node.

* * * * *